United States Patent
Niu et al.

(10) Patent No.: US 11,529,886 B2
(45) Date of Patent: Dec. 20, 2022

(54) POWER SUPPLY DURING VEHICLE OFF STATE

(71) Applicant: Ford Global Technologies, LLC, Dearborn, MI (US)

(72) Inventors: Yuming Niu, Northville, MI (US); Ming Lang Kuang, Canton, MI (US); Mark Douglas Malone, Canton, MI (US); Daniel M. King, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 452 days.

(21) Appl. No.: 16/519,026

(22) Filed: Jul. 23, 2019

(65) Prior Publication Data

US 2021/0023960 A1 Jan. 28, 2021

(51) Int. Cl.
B60L 58/12 (2019.01)
G06F 8/65 (2018.01)
B60L 50/60 (2019.01)
B60L 58/20 (2019.01)

(52) U.S. Cl.
CPC .............. B60L 58/12 (2019.02); B60L 50/66 (2019.02); B60L 58/20 (2019.02); G06F 8/65 (2013.01)

(58) Field of Classification Search
CPC .......... B60L 58/12; B60L 50/66; B60L 58/20; B60L 58/10; B60L 50/61; B60L 50/60; B60L 58/18; G06F 8/65
See application file for complete search history.

(56) References Cited

U.S. PATENT DOCUMENTS

| 5,938,705 | A | 8/1999 | Zyburt et al. |
| 6,066,899 | A * | 5/2000 | Rund ............. H02J 7/0031 307/10.7 |
| 6,452,361 | B2 | 9/2002 | Dougherty et al. |
| 8,493,022 | B2 | 7/2013 | Bertness |
| 8,655,541 | B2 | 2/2014 | You |
| 8,813,061 | B2 | 8/2014 | Hoffman et al. |

(Continued)

FOREIGN PATENT DOCUMENTS

| JP | 2017134506 A | 8/2017 |
| JP | 6460875 B2 | 1/2019 |

OTHER PUBLICATIONS

Notice of Allowance dated Mar. 23, 2022; U.S. Appl. No. 16/519,025, filed Jul. 23, 2019.

(Continued)

Primary Examiner — James J Lee
Assistant Examiner — Steven Vu Nguyen
(74) Attorney, Agent, or Firm — Frank A. MacKenzie; Bejin Bieneman PLC

(57) ABSTRACT

A power system for a vehicle includes a control module, a low-voltage battery electrically coupled to the control module, a high-voltage battery electrically coupled to the control module, an engine electrically coupled to the high-voltage battery, and a computer. The computer is programmed to, while the vehicle is in an off state, in response to a pending download to the control module, provide power to the control module with one of the low-voltage battery, the high-voltage battery, or the engine upon determining whether the low-voltage battery and the high-voltage battery have sufficient charge to power the control module for the download.

14 Claims, 6 Drawing Sheets

(56) References Cited

U.S. PATENT DOCUMENTS

| | | | |
|---|---|---|---|
| 9,229,704 B2 | 1/2016 | Throop et al. | |
| 9,404,977 B2 | 8/2016 | Tran et al. | |
| 9,421,474 B2 | 8/2016 | Derby, Jr. | |
| 9,457,684 B2 | 10/2016 | Crombez et al. | |
| 9,533,597 B2 | 1/2017 | Li et al. | |
| 9,550,421 B2 | 1/2017 | Harkins | |
| 9,575,743 B1* | 2/2017 | Chun | F02N 11/0862 |
| 9,701,264 B2 | 7/2017 | Aboudaoud | |
| 9,702,315 B1 | 7/2017 | Palmer | |
| 9,738,125 B1 | 8/2017 | Brickley et al. | |
| 9,754,325 B1 | 9/2017 | Konrardy et al. | |
| 9,921,650 B2 | 3/2018 | Levesque et al. | |
| 9,960,637 B2 | 5/2018 | Sanders et al. | |
| 10,289,194 B2 | 5/2019 | McCracken et al. | |
| 10,521,677 B2 | 12/2019 | Micks et al. | |
| 10,739,404 B2 | 8/2020 | Wandres et al. | |
| 10,832,093 B1 | 11/2020 | Taralova | |
| 10,908,051 B2 | 2/2021 | Yang | |
| 10,981,526 B2 | 4/2021 | Celinske et al. | |
| 11,052,900 B2 | 7/2021 | Shibata | |
| 11,099,561 B1 | 8/2021 | Kentley-Klay | |
| 2013/0079950 A1* | 3/2013 | You | H04L 67/12 701/1 |
| 2013/0245884 A1 | 9/2013 | Foruntanpour et al. | |
| 2015/0268722 A1 | 9/2015 | Wang et al. | |
| 2016/0245724 A1 | 8/2016 | Sasaki et al. | |
| 2017/0076019 A1 | 3/2017 | Nallapa et al. | |
| 2017/0109458 A1 | 4/2017 | Micks et al. | |
| 2017/0109928 A1 | 4/2017 | Micks et al. | |
| 2018/0091847 A1 | 3/2018 | Wu et al. | |
| 2018/0264347 A1 | 9/2018 | Tran et al. | |
| 2018/0286268 A1 | 10/2018 | Ni | |
| 2018/0345971 A1 | 12/2018 | Birnschein et al. | |
| 2019/0050050 A1 | 2/2019 | Jung et al. | |
| 2019/0322286 A1 | 10/2019 | Stefan et al. | |
| 2019/0329758 A1* | 10/2019 | Takahashi | B60W 20/13 |
| 2019/0351895 A1 | 11/2019 | Ben-Ari | |
| 2020/0001806 A1 | 1/2020 | Celinske et al. | |
| 2020/0039367 A1 | 2/2020 | Lyden | |
| 2021/0023960 A1 | 1/2021 | Niu et al. | |
| 2021/0094491 A1* | 4/2021 | Yamashita | G06F 8/654 |
| 2021/0362664 A1 | 11/2021 | Yang et al. | |

OTHER PUBLICATIONS

Non-Final Office Action re U.S. Appl. No. 16/519,025, filed Jul. 23, 2019.

* cited by examiner

POWER SUPPLY DURING VEHICLE OFF STATE

BACKGROUND

Vehicles can include propulsion to generate energy and translate the energy into motion of the vehicle. Types of propulsions include a conventional powertrain including an internal-combustion engine coupled to a transmission that transfers rotational motion to wheels; an electric powertrain including high-voltage batteries, an electric motor, and a transmission that transfers rotational motion to the wheels; and a hybrid powertrain including elements of the conventional powertrain and the electric powertrain. Vehicles of any propulsion type typically also include low-voltage batteries.

In normal operation when the vehicle is on, electrical loads are typically powered by the engine and/or the high-voltage batteries without drawing power from the low-voltage batteries. The low-voltage batteries supply power to start the vehicle, as well as in the event of transient demands from the loads for greater power than the engine and/or high-voltage batteries can supply. When the vehicle is off, electrical loads are reduced, and the remaining electrical loads are typically powered by the low-voltage batteries.

DETAILED DESCRIPTION

Figure 1:
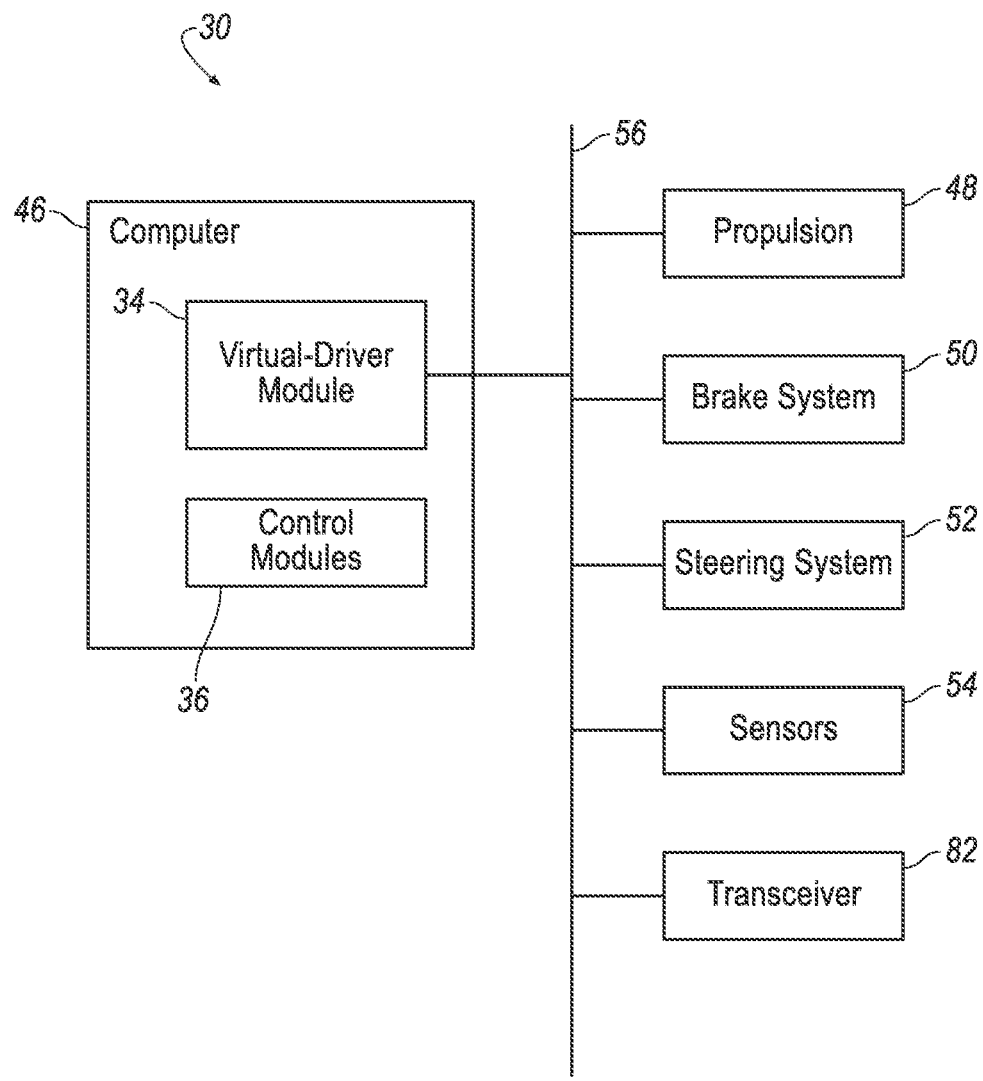
FIG. 1 is a block diagram of an example vehicle.

The system described herein can provide way to preserve battery charge while the vehicle is in an off state but is requested to download a file to update one of the control modules of the vehicle. The system can select which source of power to most optimally draw from in response to the download request in order to provide sufficient power, and the system can preserve an appropriate amount of power in the batteries of the vehicle.

A power system for a vehicle includes a control module, a low-voltage battery electrically coupled to the control module, a high-voltage battery electrically coupled to the control module, an engine electrically coupled to the high-voltage battery, and a computer programmed to, while the vehicle is in an off state, in response to a pending download to the control module, provide power to the control module with the low-voltage battery upon determining that the low-voltage battery has sufficient charge to power the control module for the download; in response to the pending download to the control module, provide power to the control module with the high-voltage battery upon determining that the low-voltage battery has insufficient charge to power the control module for the download and that the high-voltage battery has sufficient charge to power the control module for the download; and in response to the pending download to the control module, provide power to the control module by running the engine upon determining that neither the low-voltage battery nor the high-voltage battery has sufficient charge to power the control module for the download.

The engine may be switchable between a motive state in which power is delivered to wheels of the vehicle and a nonmotive state in which power is not delivered to the wheels, and providing power to the control module by running the engine may be providing power to the control module by running the engine in the nonmotive state.

The low-voltage battery may have sufficient charge to power the control module for the download if the charge of the battery is greater than a sum of an expected charge to complete the download and a charge to start the vehicle. The expected charge to complete the download may be a product of an expected duration to complete the download and a rate of power consumption for the control module in a downloading state.

Providing power to the control module with the high-voltage battery may include initializing the high-voltage battery from a dormant state by using a signal through an ignition-switch-power relay.

A computer includes a processor and a memory storing instructions executable by the processor to, while a vehicle is in an off state, in response to a pending download to a control module in the vehicle, provide power to the control module with a low-voltage battery upon determining that the low-voltage battery has sufficient charge to power the control module for the download; while the vehicle is in the off state, in response to the pending download to the control module, provide power to the control module with a high-voltage battery upon determining that the low-voltage battery has insufficient charge to power the control module for the download and that the high-voltage battery has sufficient charge to power the control module for the download; and while the vehicle is in the off state, in response to the pending download to the control module, provide power to the control module by running an engine upon determining that neither the low-voltage battery nor the high-voltage battery has sufficient charge to power the control module for the download.

The engine may be switchable between a motive state in which power is delivered to wheels of the vehicle and a nonmotive state in which power is not delivered to the wheels, and providing power to the control module by running the engine may be providing power to the control module by running the engine in the nonmotive state.

The low-voltage battery may have sufficient charge to power the control module for the download if the charge of the battery is greater than a sum of an expected charge to complete the download and a charge to start the vehicle. The expected charge to complete the download may be a product of an expected duration to complete the download and a rate of power consumption for the control module in a downloading state.

Providing power to the control module with the high-voltage battery may include initializing the high-voltage battery from a dormant state by using a signal through an ignition-switch-power relay.

A method includes, while a vehicle is in an off state, in response to a pending download to a control module in the vehicle, providing power to the control module with a low-voltage battery upon determining that the low-voltage battery has sufficient charge to power the control module for the download; while the vehicle is in the off state, in response to the pending download to the control module, providing power to the control module with a high-voltage battery upon determining that the low-voltage battery has insufficient charge to power the control module for the download and that the high-voltage battery has sufficient charge to power the control module for the download; and while the vehicle is in the off state, in response to the pending download to the control module, providing power to the control module by running an engine upon determining that neither the low-voltage battery nor the high-voltage battery has sufficient charge to power the control module for the download.

The engine may be switchable between a motive state in which power is delivered to wheels of the vehicle and a nonmotive state in which power is not delivered to the wheels, and providing power to the control module by running the engine may be providing power to the control module by running the engine in the nonmotive state.

The low-voltage battery may have sufficient charge to power the control module for the download if the charge of the battery is greater than a sum of an expected charge to complete the download and a charge to start the vehicle. The expected charge to complete the download may be a product of an expected duration to complete the download and a rate of power consumption for the control module in a downloading state.

Providing power to the control module with the high-voltage battery may include initializing the high-voltage battery from a dormant state by using a signal through an ignition-switch-power relay.

A power system 32 for a vehicle 30 includes at least one control module 36, a low-voltage battery 40 electrically coupled to the control module 36, a high-voltage battery 42 electrically coupled to the control module 36, an engine 44 electrically coupled to the high-voltage battery 42, and a computer 46. The computer 46 is programmed to, while the vehicle 30 is in an off state, in response to a pending download to the control module 36, provide power to the control module 36 with the low-voltage battery 40 upon determining that the low-voltage battery 40 has sufficient charge to power the control module 36 for the download; in response to the pending download to the control module 36, provide power to the control module 36 with the high-voltage battery 42 upon determining that the low-voltage battery 40 has insufficient charge to power the control module 36 for the download and that the high-voltage battery 42 has sufficient charge to power the control module 36 for the download; and in response to the pending download to the control module 36, provide power to the control module 36 by running the engine 44 upon determining that neither the low-voltage battery 40 nor the high-voltage battery 42 has sufficient charge to power the control module 36 for the download.

With reference to FIG. 1, the vehicle 30 may be any passenger or commercial automobile such as a car, a truck, a sport utility vehicle, a crossover, a van, a minivan, a taxi, a bus, etc.

The vehicle 30 is an autonomous or semi-autonomous vehicle. The virtual-driver module 34 can be programmed to operate the vehicle 30 independently of the intervention of a human driver, completely or to a lesser degree. The virtual-driver module 34 may be programmed to operate a propulsion 48, brake system 50, steering system 52, and/or other vehicle systems based on data provided by sensors 54. For the purposes of this disclosure, an autonomous mode means the virtual-driver module 34 controls the propulsion 48, brake system 50, and steering system 52 without input from a human driver; a semi-autonomous mode means the virtual-driver module 34 controls one or two of the propulsion 48, brake system 50, and steering system 52 and a human driver controls the remainder; and a manual mode means a human driver controls the propulsion 48, brake system 50, and steering system 52.

The virtual-driver module 34 is a microprocessor-based computer, typically, a single electronic control module (ECM). The virtual-driver module 34 includes a processor, memory, etc. The memory of the virtual-driver module 34 includes memory for storing instructions executable by the processor as well as for electronically storing data and/or databases.

The computer 46 is one or more microprocessor-based computers. The computer 46 includes memory, at least one processor, etc. The memory of the computer 46 includes memory for storing instructions executable by the processor as well as for electronically storing data and/or databases. The computer 46 may be the same controller as the virtual-driver module 34, or the computer 46 may be one or more separate controllers in communication with the virtual-driver module 34 via a communications network 56, or the computer 46 may include multiple controllers including the virtual-driver module 34. In other words, some, all, or none of the programming ascribed below to the computer 46 can be performed by the virtual-driver module 34. As a separate controller, the computer 46 may be or include, e.g., one or more electronic control units or modules 36 (ECUs or ECMs, referred to hereinafter as control modules) such as a hybrid-powertrain control module 58 and/or a battery-energy control module 60. Other control modules 36 may include a body control module 62, an antilock-brake control module 64, a first power-steering control module 66, a second power-steering control module 68, a collision-mitigation-system control module 70, an autonomous-vehicle platform-interface control module 72, an engine control module 74, an object-detection maintenance control module 76, a restraint control module 78, and an accessory control module 80 (shown in FIGS. 3A-C).

The computer 46 may transmit and receive data through the communications network 56, which may be a controller area network (CAN) bus, Ethernet, WiFi, Local Interconnect Network (LIN), onboard diagnostics connector (OBD-II), and/or by any other wired or wireless communications network. The computer 46 may be communicatively coupled to the virtual-driver module 34, the other control modules 36, the propulsion 48 including the DC/DC converters 38, the brake system 50, the steering system 52, the sensors 54, a transceiver 82, and other components via the communications network 56.

The sensors 54 may provide data about operation of the vehicle 30, for example, wheel speed, wheel orientation, and engine and transmission data (e.g., temperature, fuel consumption, etc.). The sensors 54 may detect the location and/or orientation of the vehicle 30. For example, the sensors 54 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 54 may detect the external world, e.g., objects and/or characteristics of surroundings of the vehicle 30, such as other vehicles, road lane markings, traffic lights and/or signs, pedestrians, etc. For example, the sensors 54 may include radar sensors, scanning laser range finders, light detection and ranging (LIDAR) devices, and image processing sensors such as cameras. The sensors 54 may include communications devices, for example, vehicle-to-infrastructure (V2I) or vehicle-to-vehicle (V2V) devices.

Figure 2:
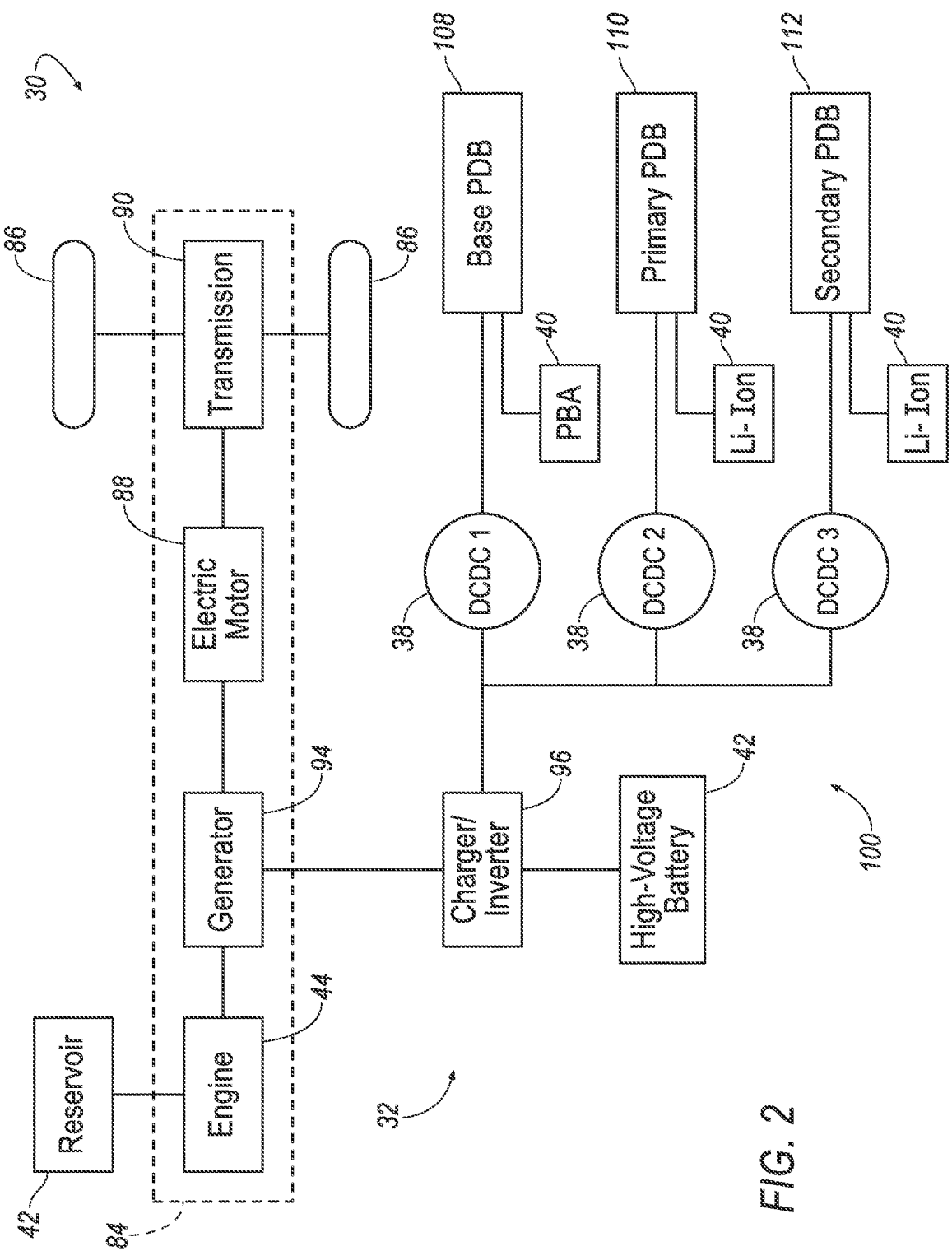
FIG. 2 is a block diagram of an example propulsion system of the vehicle of Figure

The propulsion 48 of the vehicle 30 generates energy and translates the energy into motion of the vehicle 30. As shown in FIG. 2, the propulsion 48 may be hybrid propulsion. The propulsion 48 may include a powertrain 84 in any hybrid arrangement, e.g., a series-hybrid powertrain (as shown in FIG. 2), a parallel-hybrid powertrain, a power-split (series-parallel) hybrid powertrain, etc. The propulsion 48 is described in more detail below with respect to FIG. 2. Alternatively, the propulsion 48 can be a plug-in hybrid propulsion or a battery electric propulsion. The propulsion 48 can include a control module 36 or the like, e.g., the hybrid-powertrain control module 58, that is in communication with and receives input from the virtual-driver module 34 and/or a human driver. The human driver may control the propulsion 48 via, e.g., an accelerator pedal and/or a gear-shift lever.

The brake system 50 is typically a conventional vehicle braking subsystem and resists the motion of the vehicle 30 to thereby slow and/or stop the vehicle 30. The brake system 50 may include friction brakes such as disc brakes, drum brakes, band brakes, etc.; regenerative brakes; any other suitable type of brakes; or a combination. The brake system 50 can include a control module 36 or the like, e.g., the antilock-brake control module 64, that is in communication with and receives input from the virtual-driver module 34 and/or a human driver. The human driver may control the brake system 50 via, e.g., a brake pedal.

The steering system 52 is typically a conventional vehicle steering subsystem and controls the turning of wheels 86. The steering system 52 may be a rack-and-pinion system with electric power-assisted steering, a steer-by-wire system, as both are known, or any other suitable system. The steering system 52 can include a control module 36 or the like, e.g., the first and/or second power-steering control modules 66, 68, that is in communication with and receives input from the virtual-driver module 34 and/or a human driver. The human driver may control the steering system 52 via, e.g., a steering wheel.

The transceiver 82 may be adapted to transmit signals wirelessly through any suitable wireless communication protocol, such as Bluetooth®, WiFi, IEEE 802.11a/b/g, other RF (radio frequency) communications, etc. The transceiver 82 may be adapted to communicate with a remote server, that is, a server distinct and spaced from the vehicle 30. The remote server may be located outside the vehicle 30. For example, the remote server may be associated with other vehicles (e.g., V2V communications), infrastructure components (e.g., V2I communications via Dedicated Short-Range Communications (DSRC) or the like), emergency responders, mobile devices associated with the owner of the vehicle 30, etc. The transceiver 82 may be one device or may include a separate transmitter and receiver.

With reference to FIG. 2, the propulsion 48 includes the powertrain 84 that transmits power from an engine 44, from the high-voltage battery 42, or from both the engine 44 and the high-voltage battery 42, through an electric motor 88 to a transmission 90 and ultimately to the wheels 86 of the vehicle 30. The engine 44 is an internal-combustion engine and may contain cylinders that serve as combustion chambers that convert fuel from a reservoir 92 to rotational kinetic energy. A generator 94 may receive the rotational kinetic energy from the engine 44. The generator 94 converts the rotational kinetic energy into electricity, e.g., alternating current, and powers the electric motor 88. A charger/inverter 96 may convert the output of the generator 94, e.g., the alternating current, into high-voltage direct current to supply the high-voltage battery 42 and a power-distribution system 100. For the purposes of this disclosure, "high voltage" is defined as at least 60 volts direct current or at least 30 volts alternating current. For example, the high-voltage direct current may be on the order of 300 volts. The charger/inverter 96 controls how much power is supplied from the high-voltage battery 42 to the generator 94 of the powertrain 84. The electric motor 88 may convert the electricity from the generator 94 into rotational kinetic energy transmitted to the transmission 90. The transmission 90 transmits the kinetic energy via, e.g., a drive axle to the wheels 86, while applying a gear ratio allowing different tradeoffs between torque and rotational speed.

The engine 44 is switchable between running and off. When running, the engine 44 is switchable between a motive state in which power is delivered to the wheels 86 and a nonmotive state in which power is not delivered to the wheels 86. For example, the engine 44 may be coupled to the transmission 90 in the motive state and decoupled from the transmission 90 in the nonmotive state, e.g., via a clutch (not shown).

The high-voltage battery 42 produces a voltage of at least 60 volts direct current, e.g., on the order of 300 volts direct current. The high-voltage battery 42 may be any type suitable for providing high-voltage electricity for operating the vehicle 30, e.g., lithium-ion, nickel-metal hydride, lead-acid, etc. The high-voltage battery 42 is electrically coupled to the powertrain 84 via the charger/inverter 96. The high-voltage battery 42 is electrically coupled to a plurality of loads 98 as described below.

Figure 3A:
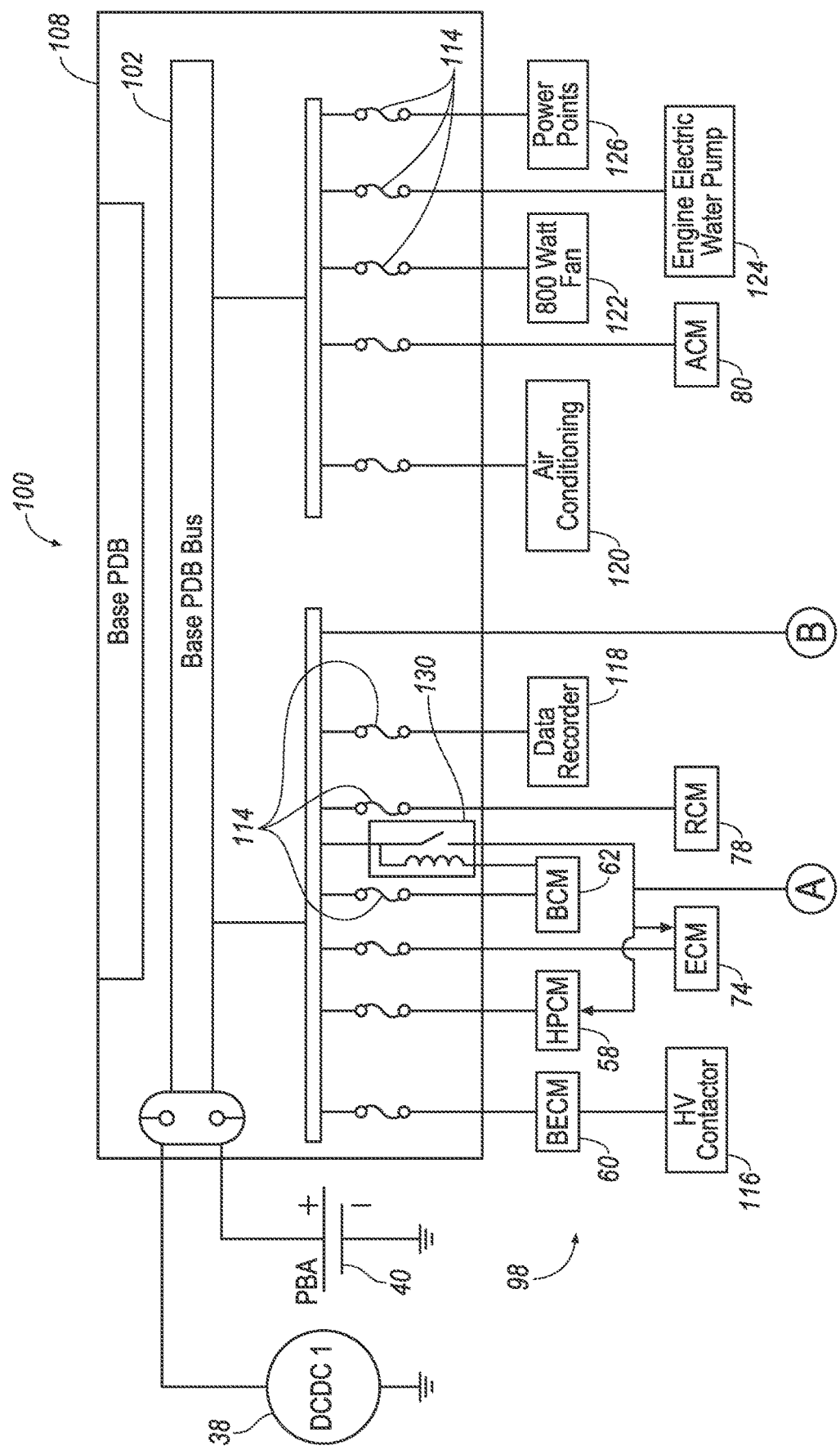
FIGS. 3A-C are circuit diagrams of an example power-distribution system of the vehicle of FIG. 1.
Figure 3B:
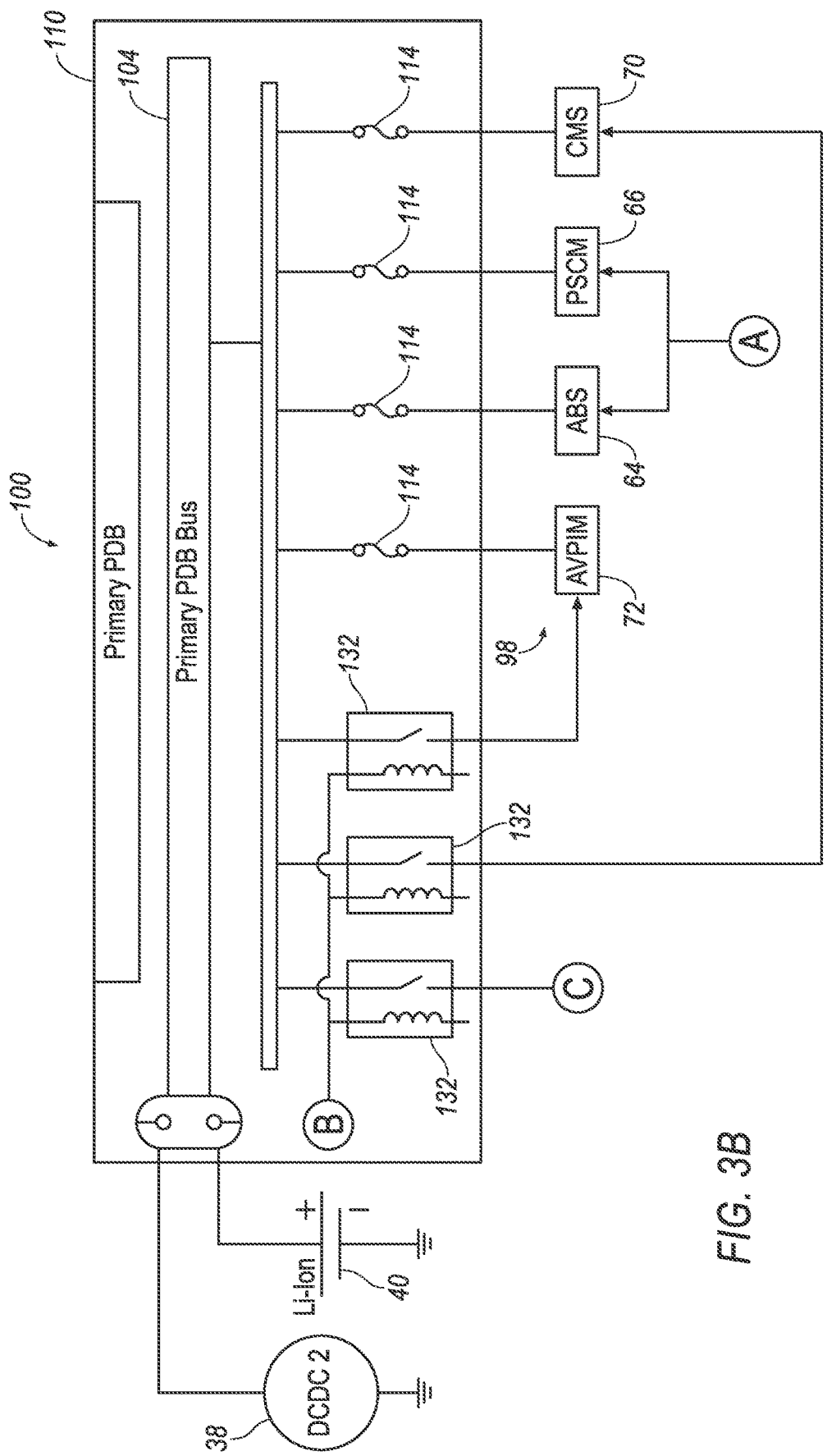
Figure 3C:
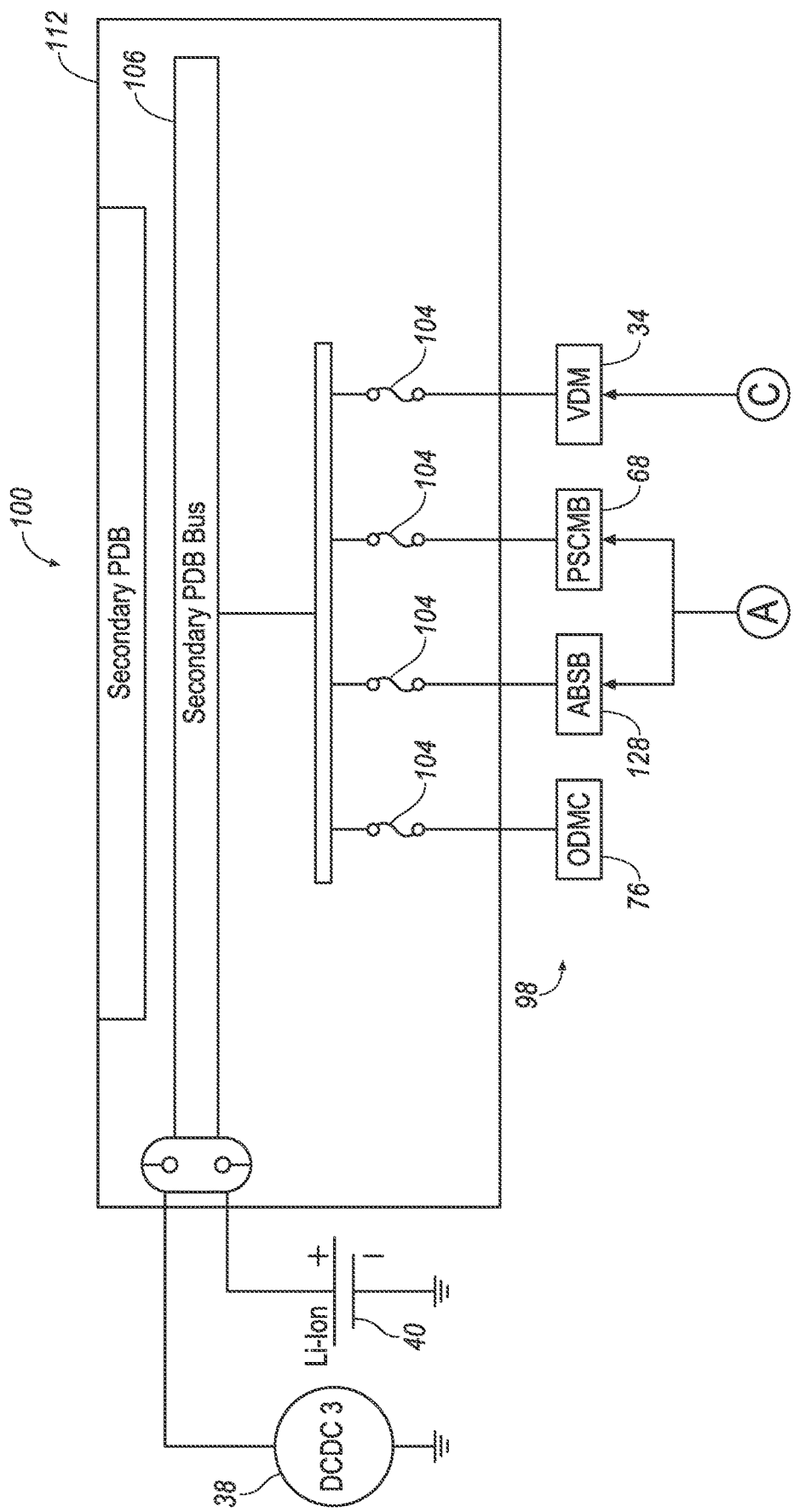

With reference to FIGS. 3A-C, the power-distribution system 100 includes the DC/DC converters 38. As shown in the example hybrid powertrain of FIG. 2, the DC/DC converters 38 are electrically coupled to the powertrain 84 via the charger/inverter 96 and to the low-voltage batteries 40. The DC/DC converters 38 may receive high-voltage direct current from the high-voltage battery 42 and/or from the engine 44 or electric motor 88 and convert the high-voltage direct current to low-voltage direct current; in general, for the hybrid arrangement as shown in FIG. 2 and for other arrangements of the propulsion 48, the DC/DC converters 38 convert high-voltage current from a high-voltage bus to low-voltage current for a low-voltage bus. For the purposes of this disclosure, "low voltage" is defined as less than 60 volts direct current or less than 30 volts alternating current. For example, the low-voltage direct current may be 12 volts or 48 volts. Each DC/DC converter 38 may exchange the low-voltage direct current with one of the low-voltage batteries 40, and each DC/DC converter 38 may supply the low-voltage direct current to one of a plurality of power-distribution-board buses 102, 104, 106.

The computer 46 can control the DC/DC converters 38 by setting a setpoint for each DC/DC converter 38. The setpoint is a voltage that the DC/DC converter 38 provides to the low-voltage bus, e.g., a respective power-distribution-board bus 102, 104, 106. Setting the setpoint of the DC/DC converter 38 higher provides a greater voltage, and thus more power, to the respective power-distribution-board bus 102, 104, 106, and setting the setpoint of the DC/DC converter 38 lower provides less voltage, and thus less power, to the respective power-distribution-board bus 102, 104, 106.

A plurality of power-distribution boards 108, 110, 112 include a base power-distribution board 108, a primary power-distribution board 110, and a secondary power-distribution board 112. The power-distribution boards 108, 110, 112 divide electricity into subsidiary circuits, i.e., the loads 98. The power-distribution boards 108, 110, 112 each include one of the power-distribution-board buses 102, 104, 106 and one or more fuses 114. The power-distribution-board buses 102, 104, 106 include a base power-distribution-board bus 102 in the base power-distribution board 108, a primary power-distribution-board bus 104 in the primary power-distribution board 110, and a secondary power-distribution-board bus 106 in the secondary power-distribution board 112.

Each low-voltage battery 40 produces a voltage less than 60 volts direct current, e.g., 12 or 48 volts direct current. The low-voltage batteries 40 may be any type suitable for providing low-voltage electricity for power the loads 98, e.g., lithium-ion, nickel-metal hydride, lead-acid, etc. For example, the low-voltage battery 40 electrically coupled to the base power-distribution board 108 is a lead-acid battery, and the low-voltage batteries 40 electrically coupled to the primary power-distribution board 110 and to the secondary power-distribution board 112 are lithium-ion batteries. The low-voltage batteries 40 are electrically coupled to the powertrain 84 via the respective DC/DC converter 38 and the charger/inverter 96, and are electrically coupled to the loads 98 on the respective power-distribution boards 108, 110, 112.

The low-voltage batteries 40 each have a state of charge that can vary between 0% (no remaining charge) and 100% (fully charged). The state of charge can be measured by various sensors (not specifically shown) of the sensors 54 monitoring the low-voltage batteries 40 in communication with the computer 46. For example, the monitoring sensors can infer the state of charge from the current flowing through the low-voltage battery 40 and from the temperature of the low-voltage battery 40 using known relationships. The state of charge can alternatively be measured in units of electrical charge, e.g., ampere-hours. The state of charge as a percentage is equal to the state of charge in units of charge divided by a capacity of the low-voltage battery 40. The capacity of a battery is a maximum quantity of charge that the battery can store.

The loads 98 include the control modules 36 as well as other types of loads 98, e.g., the battery-energy control module 60; a high-voltage contactor 116 for the battery-energy control module 60 to control electricity flow to the DC/DC converters 38, etc.; the hybrid-powertrain control module 58; the engine control module 74; the body control module 62; the restraint control module 78; a data recorder 118; an air-conditioning system 120 or components or settings of the air-conditioning system 120 such as an AC fan or a high-speed mode; the accessory control module 80; a fan 122 for cooling the engine 44; an electric water pump 124 for the engine 44; power points 126 (i.e., sockets in a passenger cabin for passengers to plug in personal devices) (as all shown in FIG. 3A); the autonomous-vehicle platform-interface control module 72; the antilock-brake control module 64; the first power-steering control module 66; the collision-mitigation-system control module 70 (as all shown in FIG. 3B); the object-detection maintenance control module 76; an antilock-brake-system backup 128; the second power-steering control module 68; and the virtual-driver module 34 (as all shown in FIG. 3C).

An ignition-switch-power relay 130 is electrically coupled to the base power-distribution-board bus 102. The ignition-switch-power relay 130 is switchable between an open state and a closed state by a signal from the body control module 62. The body control module 62 can be activated by a signal from an ignition or push-button start (not shown). The ignition-switch-power relay 130 is positioned to, when closed, provide electrical current from the base power-distribution-board bus 102 to the engine control module 74, the hybrid-powertrain control module 58, the antilock-brake control module 64, and the power-steering control modules 66, 68. The hybrid-powertrain control module 58 can activate the high-voltage battery 42 from a dormant state to an active state. In the active state, the high-voltage battery 42 can provide a voltage difference to the powertrain 84 and to the DC/DC converters 38.

A plurality of control-module relays 132 are electrically coupled to the primary power-distribution-board bus 104. The control-module relays 132 are switchable independently of each other between an open state and a closed state by a signal from the computer 46. The control-module relays 132 can each be activated by electrical current from the base power-distribution-board bus 102. Each control-module relay 132 is positioned to, when closed, provide electrical current from the primary power-distribution-board bus 104 to one of the control modules 36, e.g., as shown in FIGS. 3A-C, the collision-mitigation-system control module 70, the autonomous-vehicle platform-interface control module 72, or the virtual-driver module 34.

In normal operation, the loads 98 are typically powered via the DC/DC converters 38 without drawing power from the low-voltage batteries 40. The low-voltage batteries 40 supply power in the event of transient demands from the loads 98 for greater power than the DC/DC converters 38 can supply.

For the purposes of this disclosure, "on state" is defined as the state of the vehicle 30 in which full electrical energy is provided to electrical components, i.e., the loads 98, of the vehicle 30 and the vehicle 30 is ready to be driven, e.g., the engine 44 is running; "off state" is defined as the state of the vehicle 30 in which a low amount of electrical energy is provided to selected loads 98 of the vehicle 30, typically used when the vehicle 30 is being stored; and "accessory-power state" is defined as the state of the vehicle 30 in which full electrical energy is provided to more electrical components than in the off state and the vehicle 30 is not ready to be driven. Typically, an occupant puts the vehicle 30 into the on state when the occupant is going to drive the vehicle 30, puts the vehicle 30 into the off state when the occupant is going to leave the vehicle 30, and puts the vehicle 30 into the accessory-power state when the occupant is going to sit in but not drive the vehicle 30.

Figure 4:
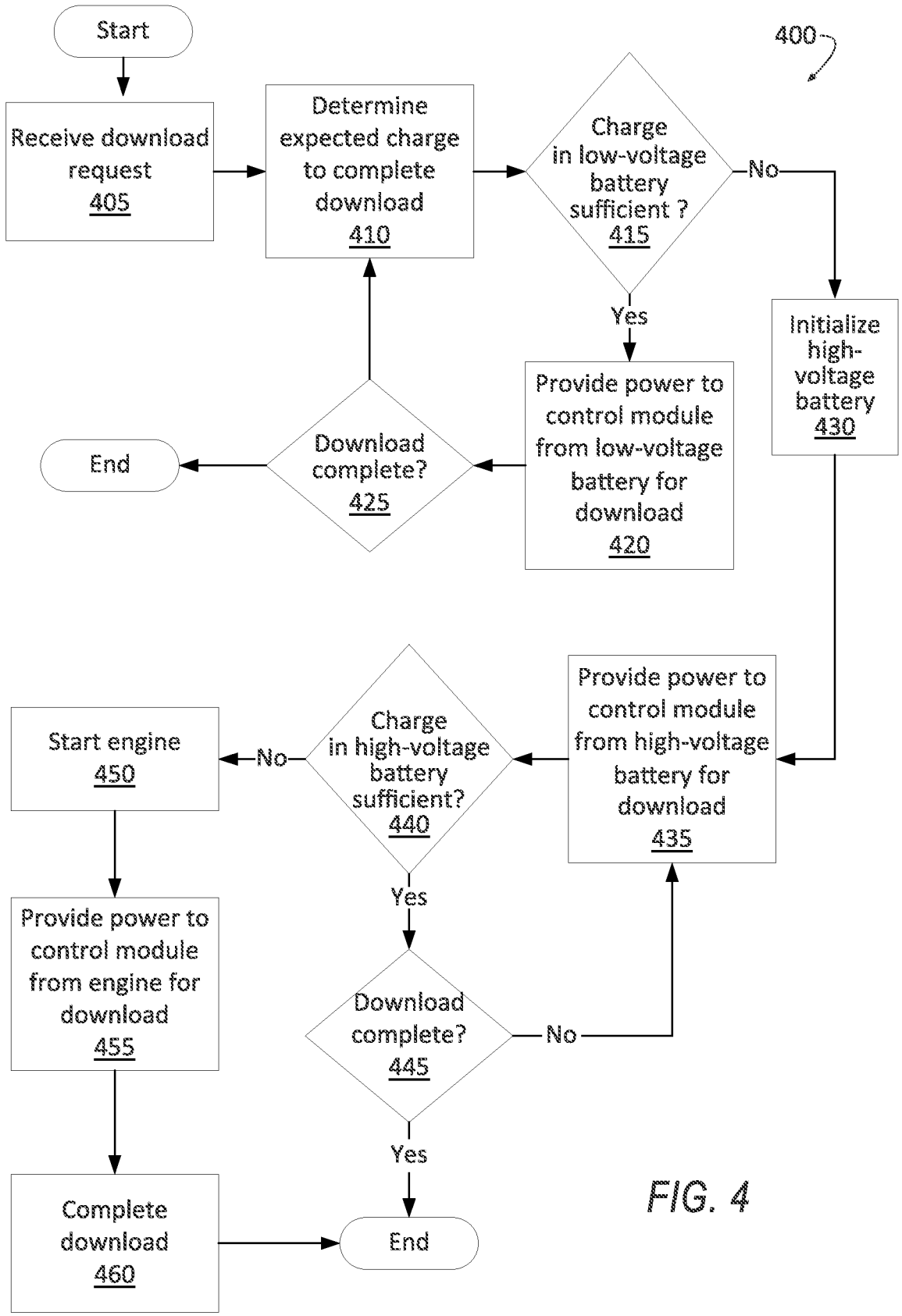
FIG. 4 is a process flow diagram of an example process for providing power to loads in the power-distribution system.

FIG. 4 is a process flow diagram illustrating an exemplary process 400 for providing power to loads 98 in the power-distribution system 100. The memory of the computer 46 stores executable instructions for performing the steps of the process 400. As a general overview of the process 400, the computer 46 receives a request for a download to one of the control modules 36, provides power to the control module 36 from the low-voltage battery 40 if the low-voltage battery 40 has sufficient charge, initializes and provides power to the control module 36 from the high-voltage battery 42 if the low-voltage battery 40 does not have sufficient charge and the high-voltage battery 42 does have sufficient charge, and starts and provides power to the control module 36 from the engine 44 if neither the low-voltage battery 40 nor the high-voltage battery 42 has sufficient charge. The process 400 occurs while the vehicle 30 is in the off state.

The process 400 begins in a block 405, in which the computer 46 receives a request for one of the control modules 36 to perform a download pending, e.g., on the remote server. The download can be an update to software on the relevant control module 36. The request can originate in a remote server and be transmitted to the computer 46 via the transceiver 82 and the communications network 56.

Next, in a block 410, the computer 46 determines an expected charge to complete the download. The expected charge can be estimated as an expected duration to complete the download and a rate of power consumption for the control module 36 in a downloading state. The expected duration can be estimated based on a remaining file size and a current bandwidth, which can be a minimum bandwidth of a bandwidth of a network between the transceiver 82 and the remote server, a bandwidth of the transceiver 82, and a bandwidth of the communications network 56. The file size can be included in the request. The rate of power consumption of the control module 36 in a downloading state can be determined experimentally and stored in the memory of the computer 46.

Next, in a decision block 415, the computer 46 determines whether the low-voltage battery 40 coupled to the power-distribution board 108, 110, 112 including the control module 36 has sufficient charge to power the control module 36 for the download. The low-voltage battery 40 has sufficient charge to power the control module 36 for the download if the charge of the low-voltage battery 40 is greater than a sum of the expected charge to complete the download, as determined in the block 410, and a charge to start the vehicle 30. The charge to start the vehicle 30 can be experimentally determined and stored in the memory of the computer 46. If the low-voltage battery 40 has sufficient power, the process 400 proceeds to a block 420. If the low-voltage battery 40 has insufficient power, the process 400 proceeds to a block 430.

In the block 420, the computer 46 provides power to the control module 36 from the respective low-voltage battery 40 for the control module 36 to perform the download. The high-voltage battery 42 remains in a dormant state.

Next, in a decision block 425, the computer 46 determines whether the download is complete. For example, the computer 46 can check whether a message within the download indicates that the entirety of the file has been downloaded or whether a size of the currently downloaded file is equal to a file size included in the request. If the download is complete, the process 400 ends. If the download is not yet complete, the process 400 returns to the block 410 to check whether the low-voltage battery 40 still has sufficient charge to complete the download.

In the block 430, the computer 46 initializes the high-voltage battery 42, i.e., switches the high-voltage battery 42 from the dormant state to the active state. For example, the computer 46 can instruct the ignition-switch-power relay 130 to turn on the hybrid-powertrain control module 58, and the hybrid-powertrain control module 58 can initialize the high-voltage battery 42.

Next, in a block 435, the computer 46 can provide power to the control module 36 from the high-voltage battery 42. For example, the computer 46 can set the setpoint of the DC/DC converter 38 coupled to the respective power-distribution-board bus 102, 104, 106 to a voltage based on the power demand. The voltage of the setpoint of the DC/DC converter 38 can be determined to provide sufficient power to complete the download.

Next, in a decision block 440, the computer 46 determines whether the high-voltage battery 42 has sufficient charge to power the control module 36 for the download. The high-voltage battery 42 has sufficient charge to power the control module 36 for the download if the charge of the battery is greater than a sum of the expected charge to complete the download, as determined in the block 410, and a charge to put the vehicle 30 in a minimal risk condition. For the purposes of this disclosure, "minimal risk condition" has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human driver fails to respond appropriately to a request to take over the dynamic driving task." (U.S. Dept. of Transportation & NHTSA, *Automated Driving Systems* 2.0: *A Vision for Safety*, at 26 (citing SAE International J3016, International Taxonomy and Definitions for Terms Related to Driving Automation Systems for On-Road Motor Vehicles (J3016:September 2016)).) For example, putting the vehicle 30 in the minimal risk condition may be initiating a handover to the human driver or autonomously driving the vehicle 30 to a halt at a roadside, i.e., stopping the vehicle 30 outside active lanes of traffic. To determine whether a charge is sufficiently high to put the vehicle 30 in a minimal risk condition, the computer 46 can determine whether the charge is above a charge threshold stored in the memory of the computer 46. The charge threshold is chosen by experimentally testing how much charge is consumed to put the vehicle 30 in the minimal risk condition. If the high-voltage battery 42 has sufficient power, the process 400 proceeds to a decision block 445. If the high-voltage battery 42 has insufficient power, the process 400 proceeds to a block 450.

In the decision block 445, the computer 46 determines whether the download is complete, as described above with respect to the decision block 425. If the download is complete, the process 400 ends. If the download is not yet complete, the process 400 returns to the block 435 to check whether the high-voltage battery 42 still has sufficient charge to complete the download.

In the block 450, the computer 46 starts the engine 44. For example, the computer 46 can instruct the ignition-switch-power relay 130 to turn on the engine control module 74, and the engine control module 74 can provide power to start the engine 44. The engine control module 74 instructs the engine 44 to run in the nonmotive state.

Next, in a block 455, the computer 46 provides power to the control module 36 from the engine 44 running in the nonmotive state. For example, the engine 44 supplies power to DC/DC converter 38 coupled to the relevant power-distribution board 108, 110, 112 via the generator 94 and the charger/inverter 96.

Next, in a block 460, the computer 46 completes the download to the control module 36 using the power provided by the engine 44. After the block 460, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A power system for a vehicle comprising:
   a control module;
   a low-voltage battery electrically coupled to the control module;
   a high-voltage battery electrically coupled to the control module;
   an engine electrically coupled to the high-voltage battery; and
   a computer programmed to, while the vehicle is in an off state,
      in response to a pending download to the control module, provide power to the control module with the low-voltage battery upon determining that the low-voltage battery has sufficient charge to power the control module for the download;
      in response to the pending download to the control module, provide power to the control module with the high-voltage battery upon determining that the low-voltage battery has insufficient charge to power the control module for the download and that the high-voltage battery has sufficient charge to power the control module for the download;
      in response to the pending download to the control module, provide power to the control module by running the engine upon determining that neither the low-voltage battery nor the high-voltage battery has sufficient charge to power the control module for the download; and
      after beginning the download with the control module powered by the low-voltage battery, provide power to the control module with the high-voltage battery upon determining that the low-voltage battery has insufficient charge to power the control module for a remainder of the download and that the high-voltage battery has sufficient charge to power the control module for the remainder of the download;

wherein the low-voltage battery has sufficient charge to power the control module for the download if the charge of the low-voltage battery is greater than a sum of an expected charge to complete the download and a charge to start the vehicle; and the high-voltage battery has sufficient charge to power the control module for the download if the charge of the high-voltage battery is greater than a sum of the expected charge to complete the download and a charge to put the vehicle in a minimal risk condition.

2. The power system of claim 1, wherein the engine is switchable between a motive state in which power is delivered to wheels of the vehicle and a nonmotive state in which power is not delivered to the wheels, and the programming to provide power to the control module by running the engine is programming to provide power to the control module by running the engine in the nonmotive state.

3. The power system of claim 1, wherein the expected charge to complete the download is a product of an expected duration to complete the download and a rate of power consumption for the control module in a downloading state.

4. The power system of claim 1, wherein the programming to provide power to the control module with the high-voltage battery includes programming to initialize the high-voltage battery from a dormant state by using a signal through an ignition-switch-power relay.

5. The power system of claim 1, wherein the computer is further programmed to, after beginning the download with the control module powered by the high-voltage battery, provide power to the control module by running the engine upon determining that the high-voltage battery has insufficient charge to power the control module for a remainder of the download.

6. The power system of claim 1, wherein the computer is further programmed to determine a charge to power the control module for the download based on a bandwidth for the download.

7. A computer comprising a processor and a memory storing instructions executable by the processor to:

while a vehicle is in an off state, in response to a pending download to a control module in the vehicle, provide power to the control module with a low-voltage battery upon determining that the low-voltage battery has sufficient charge to power the control module for the download;

while the vehicle is in the off state, in response to the pending download to the control module, provide power to the control module with a high-voltage battery upon determining that the low-voltage battery has insufficient charge to power the control module for the download and that the high-voltage battery has sufficient charge to power the control module for the download;

while the vehicle is in the off state, in response to the pending download to the control module, provide power to the control module by running an engine upon determining that neither the low-voltage battery nor the high-voltage battery has sufficient charge to power the control module for the download; and after beginning the download with the control module powered by the low-voltage battery, provide power to the control module with the high-voltage battery upon determining that the low-voltage battery has insufficient charge to power the control module for a remainder of the download and that the high-voltage battery has sufficient charge to power the control module for the remainder of the download;

wherein the low-voltage battery has sufficient charge to power the control module for the download if the charge of the low-voltage battery is greater than a sum of an expected charge to complete the download and a charge to start the vehicle; and the high-voltage battery has sufficient charge to power the control module for the download if the charge of the high-voltage battery is greater than a sum of the expected charge to complete the download and a charge to put the vehicle in a minimal risk condition.

8. The computer of claim 7, wherein the engine is switchable between a motive state in which power is delivered to wheels of the vehicle and a nonmotive state in which power is not delivered to the wheels, and the instruction to provide power to the control module by running the engine is an instruction to provide power to the control module by running the engine in the nonmotive state.

9. The computer of claim 7, wherein the expected charge to complete the download is a product of an expected duration to complete the download and a rate of power consumption for the control module in a downloading state.

10. The computer of claim 7, wherein the instruction to provide power to the control module with the high-voltage battery includes an instruction to initialize the high-voltage battery from a dormant state by using a signal through an ignition-switch-power relay.

11. A method comprising:

while a vehicle is in an off state, in response to a pending download to a control module in the vehicle, providing power to the control module with a low-voltage battery upon determining that the low-voltage battery has sufficient charge to power the control module for the download;

while the vehicle is in the off state, in response to the pending download to the control module, providing power to the control module with a high-voltage battery upon determining that the low-voltage battery has insufficient charge to power the control module for the download and that the high-voltage battery has sufficient charge to power the control module for the download;

while the vehicle is in the off state, in response to the pending download to the control module, providing power to the control module by running an engine upon determining that neither the low-voltage battery nor the high-voltage battery has sufficient charge to power the control module for the download; and after beginning the download with the control module powered by the low-voltage battery, providing power to the control module with the high-voltage battery upon determining that the low-voltage battery has insufficient charge to power the control module for a remainder of the download and that the high-voltage battery has sufficient charge to power the control module for the remainder of the download;

wherein the low-voltage battery has sufficient charge to power the control module for the download if the charge of the low-voltage battery is greater than a sum of an expected charge to complete the download and a charge to start the vehicle; and the high-voltage battery has sufficient charge to power the control module for the download if the charge of the high-voltage battery is greater than a sum of the expected charge to complete the download and a charge to put the vehicle in a minimal risk condition.

12. The method of claim 11, wherein the engine is switchable between a motive state in which power is delivered to wheels of the vehicle and a nonmotive state in which power is not delivered to the wheels, and the step of providing power to the control module by running the engine is providing power to the control module by running the engine in the nonmotive state.

13. The method of claim 11, wherein the expected charge to complete the download is a product of an expected duration to complete the download and a rate of power consumption for the control module in a downloading state.

14. The method of claim 11, wherein the step of providing power to the control module with the high-voltage battery includes initializing the high-voltage battery from a dormant state by using a signal through an ignition-switch-power relay.

* * * * *